United States Patent [19]
Grisé

[11] 3,742,723
[45] July 3, 1973

[54] PIPE FREEZING DEVICE
[76] Inventor: Frederick G. J. Grisé, Box 12, West Brookfield, Mass.
[22] Filed: Nov. 5, 1971
[21] Appl. No.: 195,980

[52] U.S. Cl............. 62/293, 62/64, 138/97, 138/99
[51] Int. Cl.............................................. F25d 3/00
[58] Field of Search.................... 62/293; 138/99

[56] References Cited
UNITED STATES PATENTS

| | | | |
|---|---|---|---|
| 2,483,082 | 9/1949 | Young | 62/293 |
| 2,566,301 | 9/1951 | Albert | 62/514 |
| 2,572,555 | 10/1951 | Young | 62/293 |
| 3,559,423 | 2/1971 | Scheidler | 62/293 |

Primary Examiner—William J. Wye
Attorney—Charles R. Fay

[57] ABSTRACT

A pipe freezing device comprising a chamber to surround the pipe at the desired point of freezing, a source of Freon or the like liquid under pressure, and a valve for directing gas from the liquid into the bottom portion of the chamber against the pipe, the chamber having a vent for the gas.

9 Claims, 4 Drawing Figures

PATENTED JUL 3 1973 3,742,723

FREDERICK G. J. GRISÉ
INVENTOR.

BY Charles R. Fay, atty.

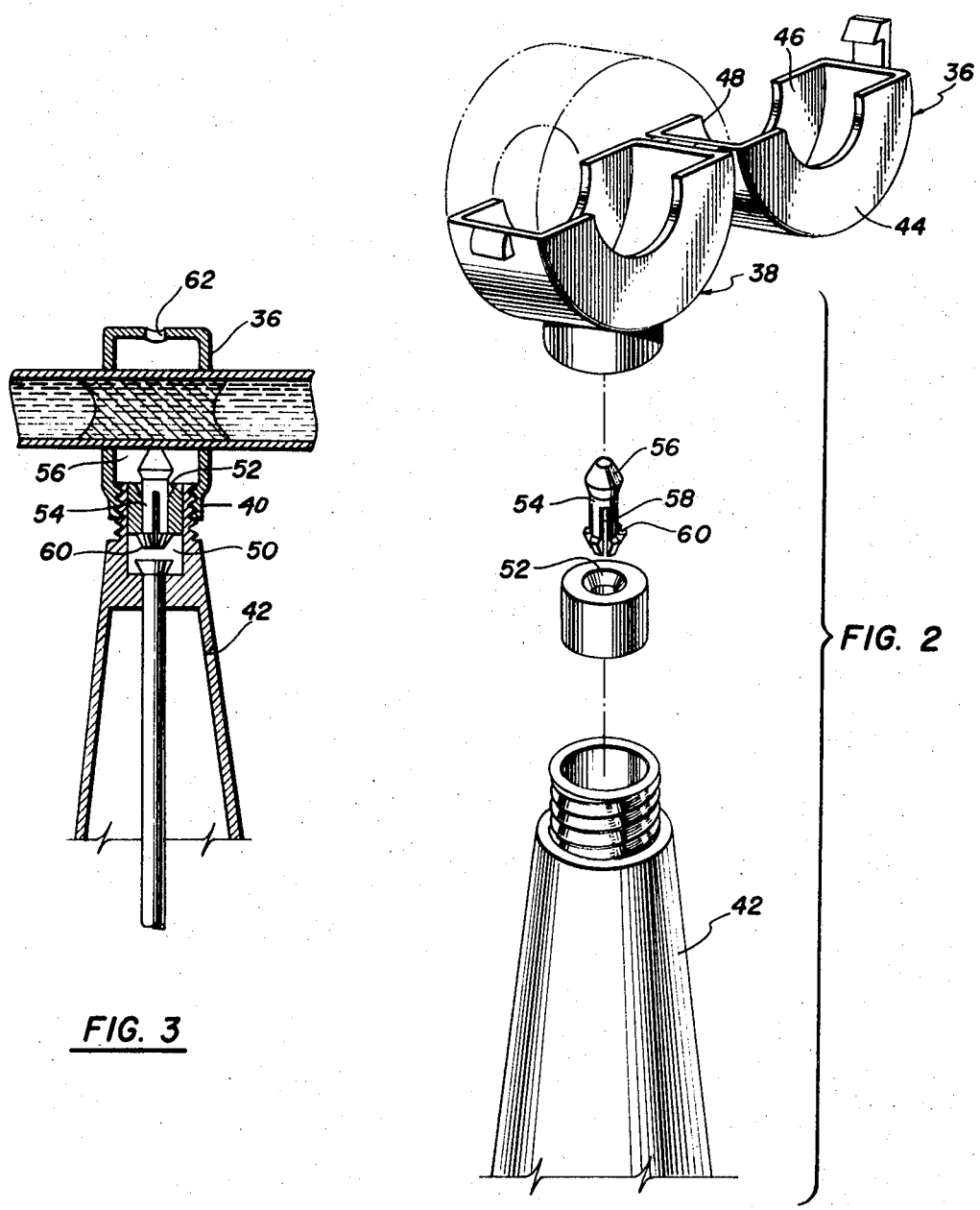

PIPE FREEZING DEVICE

BACKGROUND OF THE INVENTION

It has been long recognized that it is possible to freeze for instance a water pipe or the like while the pipe downstream of the freeze is being worked on, and many devices have been suggested for performing this function.

However it has generally been found that the prior art devices are not particularly efficient. Recirculating systems for the freezing gas have been utilized cutting the efficiency of the system very greatly, and also requiring that a relatively long length of pipe be actually covered in order to apply the freezing gas thereto. Such devices have been found to be cumbersome, inefficient and providing little if any beneficial usage over shutting the flow of the liquid material off even at a remote joint rather than freezing. The present invention has for its object the provision of an inexpensive, extremely simple, easily operated, small device which uses a very small amount of the freezing gas which is not recirculated but escapes to the atmosphere not only increasing the efficiency but making it possible to design a much more easily operated pipe freezing device of small size.

SUMMARY OF THE INVENTION

An annular chamber is placed about the pipe, this chamber comprising a lower temperature rubber one-piece annular member that has an outer wall and side walls, the latter being shaped to closely receive the pipe. This annular member has an inlet at one point for the gas and a vent at another position, a handle, a tube in the handle for the gas, and a valve on the handle to pinch the tube to adjust the flow.

The chamber member is provided with a lipped slit radially arranged from the periphery to the inner portion thereof that engages the pipe, and this chamber member is applied to the pipe at the desired location by placing the lips against the pipe and pushing it, the lips opening up under this pressure to snap over and about the pipe. Then the valve is turned on and the gas freezes the liquid in the pipe extremely fast.

In another form of the invention, the annular chamber includes a bottom member and a top member hinged together at corresponding ends and latched at their other ends diametrically across the pipe thereby forming the full annular chamber. The bottom chamber is provided with a valve to admit or close off the pressurized freezing gas, and the top chamber is provided diametrically opposite thereof with a vent allowing the gas to escape continually. In either case, the pipe may be frozen and the gas then momentarily turned off or greatly reduced in flow, maintaining the freeze at the point desired.

BRIEF DESCRIPTION OF THE DRAWINGS

FIG. 2 is an exploded perspective view illustrating the modification applied to a pipe;
FIG. 3 is a sectional view through the modification.

PREFERRED EMBODIMENT OF THE INVENTION

Figures 1, 4:
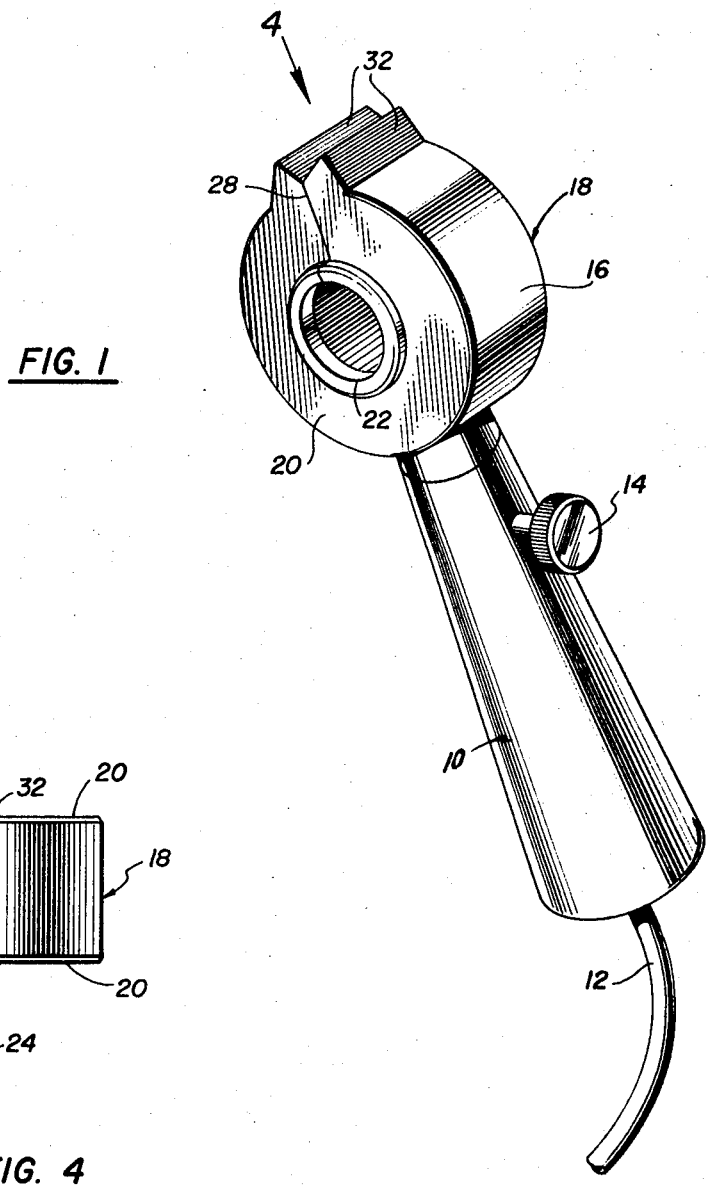
FIG. 1 is a perspective view illustrating the device.
FIG. 4 is a view looking in the direction of arrow 4 in FIG. 1.

As shown in FIG. 1, a hollow handle 10 contains a tube 12 and has a thumb valve 14 that closes the tube by pinching it in a well known manner. The tube is connected into and through the annular chamber-forming member 18. This member has no inner wall but a pair of spaced side walls 20 with circular openings 22 fit about the pipe 24 to be frozen. The chamber is formed by the outer wall 16, side walls 20, and the exterior surface of the pipe when enclosed, FIG. 4, and the gas flows all about the pipe when the valve 14 is turned to allow the tube to open. The gas escapes through a vent 26, and once the pipe is frozen, the gas can be turned down to maintain it frozen.

The chamber forming member is made of any low temperature, resilient, self-sustaining material, e.g., silicone rubber, and it has slits 28 and 30 in the side walls and outer wall respectively, the slit 30 being encompassed by a pair of generally triangular lips 32. All that is necessary to apply the device to a pipe is to place the lips against the pipe and push with the handle. The lips spread apart and snap back together over the pipe.

In the modification, the annular chamber is provided by a top, one-half part generally indicated at 36 and a bottom one-half part at 38, the latter having a screw connection 40 for a handle 42. The top part is a semi-circular open trough-like member having opposite side walls 44, 46 with a central opening 48 in each side wall, these openings fitting the pipe. The bottom part has side walls with openings complementary to the top part.

The parts are hinged and there is a latch of any kind to lock the parts together about the pipe in the position shown in FIG. 3.

The handle is formed to hold a hose or pipe connected to a source of liquid gas leading the same into chamber 50 which has a valve seat 52 having a central through opening for the reception of the valve stem which is indicated at 54. The valve seat is provided with a cone shaped end portion for the reception of a complementary cone shaped head 56 on the valve stem.

The valve stem is longitudinally slotted at 58 and by reason of the head at 56 and a similar head reversed with respect thereto at 60 the same is held captive with respect to the valve seat, but can slide therein.

The free end of head 56 abuts the pipe and secures the valve stem in stop position when the valve seat is rising to cut off the gas. On the other hand when the valve seat is lowered by proper rotation of handle 42, it is held in the position shown in FIG. 3 at least until such time as the lower edge of the valve seat contacting the head 60 of the valve stem also lowers it, but this is not necessary to the operation of the device.

As shown in FIG. 3 the gas flows into the bottom portion of the annular chamber and around the pipe in both directions to a small vent or the like at 62 where it escapes. When it is desired to shut the gas off or to reduce its volume the handle is turned in a direction to cause the valve seat to rise with respect to the valve stem, gradually cutting it off by reason of the application of the conical area 60 to the complementary conical head 56. By this means the flow of gas is minutely controlled.

It takes but a very little gas to solidly freeze the pipe and as soon as it has been frozen and the liquid flow in the pipe stopped, the flow of gas can be reduced or even momentarily stopped, but it is usually the practice to maintain a very slight flow of gas just sufficient to maintain the freeze.

I claim:

1. A pipe freezing device comprising an annular chamber having an outer circumferential wall and side walls thereon, and an open inside aspect, means removably securing the chamber about the pipe to be frozen, with the open inside aspect of the chamber contiguous with respect to the pipe and the side walls closely embracing the pipe, a source of gas-forming liquid under pressure, a tube adapted to connect the source to a wall of the chamber, and a vent in the chamber for the gas, said vent being remote from the tube so that the gas-forming liquid and gas formed therefrom extend about the pipe to be frozen, the gas escaping freely to the atmosphere through the vent.

2. The device of claim 1 wherein the outer wall and the side walls are integral, yieldable, and resilient, and a slit through the walls and into the chamber through which the pipe enters the chamber by causing the walls to yield.

3. The device of claim 1 including shaped pipe fitting openings in the side walls.

4. The device of claim 3 including outstanding divergent guide lips at the sides of the slit in the outer wall.

5. The pipe freezing device of claim 1 including a handle for the chamber, and a valve for the tube associated with the handle.

6. The pipe freezing device of claim 5 including means on the handle to control the valve.

7. The pipe freezing device of claim 6 wherein the last named means is rectilinearly movable, and including means to move the same by rotation of the handle.

8. The pipe freezing device of claim 1 including a handle connected to a wall of the annular chamber, the tube extending through the handle.

9. The pipe freezing device of claim 8 wherein the handle is elongated and includes wall portions about the tube spaced from the tube.

* * * * *

REEXAMINATION CERTIFICATE (361st)

United States Patent [19]

Grisé

[11] B1 3,742,723

[45] Certificate Issued Jun. 25, 1985

[54] PIPE FREEZING DEVICE

[76] Inventor: Frederick G. J. Grisé, Box 12, West Brookfield, Mass. 01506

Reexamination Request:
No. 90/000,398, Jun. 8, 1983

Reexamination Certificate for:
Patent No.: 3,742,723
Issued: Jul. 3, 1973
Appl. No.: 195,980
Filed: Nov. 5, 1971

[51] Int. Cl.³ .............................................. F25D 3/00
[52] U.S. Cl. ...................................... 62/293; 62/64; 138/97; 138/99
[58] Field of Search ................. 62/293, 64; 138/97, 138/99

[56] References Cited

U.S. PATENT DOCUMENTS

| | | | |
|---|---|---|---|
| 2,572,555 | 10/1951 | Young | 62/1 |
| 2,721,582 | 10/1955 | Hoke | 138/99 |
| 3,559,423 | 2/1971 | Scheidler | 62/293 |
| 3,695,301 | 10/1972 | Pittman | 138/97 |

FOREIGN PATENT DOCUMENTS

| | | |
|---|---|---|
| 586226 | 4/1947 | United Kingdom . |
| 601278 | 5/1948 | United Kingdom . |

*Primary Examiner*—William E. Tapolcai

[57] ABSTRACT

A pipe freezing device comprising a chamber to surround the pipe at the desired point of freezing, a source of Freon or the like liquid under pressure, and a valve for directing gas from the liquid into the bottom portion of the chamber against the pipe, the chamber having a vent for the gas.

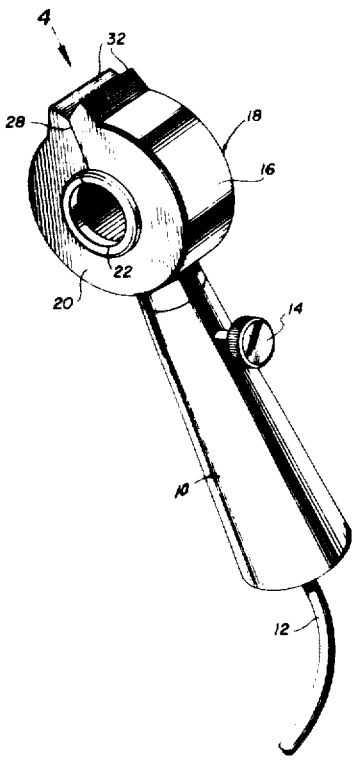

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 5 and 8 are determined to be patentable as amended.

Claims 2-4, 6, 7 and 9, dependent on an amended claim, are determined to be patentable.

1. A pipe freezing device comprising an annular chamber having an outer circumferential wall and side walls thereon, and an open inside aspect, means removably securing the chamber about the pipe to be frozen, with the open inside aspect of the chamber contiguous with respect to the pipe and the side walls closely embracing the pipe, *the annular chamber being open adjacent the outer wall in both circumferential directions over the entire length of the outer wall,*
   a source of gas-forming liquid under pressure, a tube adapted to connect the source to a wall of the chamber, and a vent in the chamber for the gas, said vent being remote from the tube so that the gas-forming liquid and gas formed therefrom extend about the pipe to be frozen, the gas escaping freely to the atmosphere through the vent.

5. *A pipe freezing device comprising an annular chamber having an outer circumferential wall and side walls thereon, and an open inside aspect, means removably securing the chamber about the pipe to be frozen, with the open inside aspect of the chamber contiguous with respect to the pipe and the side walls closely embracing the pipe, a source of gas-forming liquid under pressure, a tube adapted to connect the source to a wall of the chamber, and a vent in the chamber for the gas, said vent being remote from the tube so that the gas-forming liquid and gas formed therefrom extend about the pipe to be frozen, the gas escaping freely to the atmosphere through the vent,* [The] *the* pipe freezing device [of claim 1] including a handle for the chamber, and a valve for the tube associated with the handle.

8. *A pipe freezing device comprising an annular chamber having an outer circumferential wall and side walls thereon, and an open inside aspect, means removably securing the chamber about the pipe to be frozen, with the open inside aspect of the chamber contiguous with respect to the pipe and the side walls closely embracing the pipe, a source of gas-forming liquid under pressure, a tube adapted to connect the source to a wall of the chamber, and a vent in the chamber for the gas, said vent being remote from the tube so that the gas-forming liquid and gas formed therefrom extend about the pipe to be frozen, the gas escaping freely to the atmosphere through the vent,* [The] *the* pipe freezing device [of claim 1] including a handle connected to a wall of the annular chamber, the tube extending through the handle.

* * * * *